Patented Nov. 16, 1937

2,099,501

UNITED STATES PATENT OFFICE 2,099,501

NITROCELLULOSE EMULSIONS AND METHOD OF PRODUCING

John K. Speicher, Newark, Del., assignor to Hercules Powder Company, Wilmington, Del., a corporation of Delaware No Drawing. Application April 4, 1935, Serial No. 14,637

16 Claims. (Cl. 134—79)

This invention relates to an improvement in nitrocellulose emulsions and method of producing, and more particularly relates to such emulsions comprising a substantially water-immiscible solution of nitrocellulose emulsified in disperse phase in water and which will be characterized by a capacity to dry to a clear film under conditions of high humidity.

Heretofore nitrocellulose emulsions have been known and it has been recognized that where the nitrocellulose solution phase of such emulsions comprises a solvent or solvent mixture of high boiling point, they will dry to a clear film not only under conditions of low or medium humidity, but under conditions of humidity as high, for example, as 85%–90%.

Nitrocellulose emulsions including high boiling solvents in the nitrocellulose phase and capable of drying to a clear film under conditions of high humidity, as heretofore known, are desirable and efficient where they are to be dried under conditions of high humidity, but they are distinctly uneconomic where they are dried under medium or low humidity conditions, due to the high cost of high boiling solvents and the lack of necessity therefor under such conditions.

Now in accordance with this invention, there is provided a novel and highly advantageous nitrocellulose emulsion, which will dry to a clear film under conditions of very high humidity and which, at the same time, will be readily prepared by simple procedure in accordance with the method of this invention, which will appear from the following detailed description:

Generally speaking nitrocellulose emulsions in accordance with this invention will comprise a substantially water-immiscible solution of nitrocellulose, emulsified in disperse phase in water and also a water-immiscible solvent, or solvent mixture, for nitrocellulose of higher boiling point than that of the solvent or solvent mixture of the nitrocellulose solution, emulsified in the water as a separate disperse phase distinct from the nitrocellulose solution phase. Thus, it will be observed the emulsion in accordance with this invention will comprise water as the continuous phase and two distinct dispersed phases, one of which will comprise specifically a solvent, or solvent mixture, having a boiling point higher than that of the solvent or of the low end of the solvent mixture of the nitrocellulose solution and which will form the other dispersed phase.

From the method standpoint, a nitrocellulose solution will first be emulsified in water with use of any suitable emulsifying agent and passing through a homogenizer, then when the emulsion is to be applied a solvent of higher boiling point than the solvent of the nitrocellulose solution is emulsified in disperse phase in the water of the emulsion by shaking or stirring.

On drying the emulsion in accordance with this invention, it will be found that when the emulsion breaks the dispersed high boiling solvent and the dispersed nitrocellulose solution will coalesce with the result that the high boiling solvent will fortify the solution and the evaporation rate of the solution will be retarded and the solution will dry to a clear film under humidity conditions under which the original solution would dry to a white or cloudy film.

In practical adaptation of this invention, a medium or low boiling solvent, or solvent mixture including a low boiling solvent constituent will be used for the formation of the nitrocellulose solution and a high boiling solvent, or one boiling higher than the lowest boiling solvent constituent of the nitrocellulose solution will be emulsified in the water of the emulsion. As illustrative, for example, a solvent boiling below about 150° C. at atmospheric pressure, or a solvent mixture the lowest boiling solvent constituent of which has a boiling point of below about 150° C. may be used for formation of the nitrocellulose solution, while a solvent boiling about 150° C., at atmospheric pressure, for example 165° C., will be emulsified in the water of the emulsion.

Any desired type of nitrocellulose may be used and selection will depend upon the ultimate use of the emulsion. The concentration of nitrocellulose and the ratio of nitrocellulose solution to water may be widely varied. However, for most purposes a nitrocellulose solution of a concentration of 10%–50% and a ratio of solution to water of 2:1–3:1 will be found efficient. The nitrocellulose solution may contain nirocellulose alone or any of the usual and well known ingredients of lacquers and enamels, such as gums, resins, plasticizers, pigments, etc.

The emulsifying agent may be of any well known type, such as a soap, as sodium oleate, sulphonated castor oil, a sodium salt of a halfester sulphate of a higher aliphatic alcohol, as sodium lauryl sulphate, sodium cetyl sulphate, etc., or other suitable emulsifying agent, or mixtures thereof. The emulsifying agent will be dissolved in the water and will be used in any suitable quantity, depending upon the particular agent.

In the making up of the nitrocellulose solution any desired low or medium boiling water-immiscible solvent or solvent mixture may be used. For example, the solvent may be secondary hexyl acetate, butyl acetate, heptyl acetate, butyl butyrate, butyl propionate, or mixtures thereof, and with which may be included, if desired, various diluents as, for example, butanol, octyl alcohol, hexyl alcohol, high flash solvent naphtha, xylol, etc.

As the high boiling solvent for dispersion in the emulsion, any water-immiscible solvent having a boiling point above 150° C., for example, 165° C. may be used. As illustrative, for example, butyl lactate, octyl acetate, fenchone, etc., will be found efficient. Also mixtures of the above or other high-boiling solvents may be used, likewise mixtures of solvent and non-solvent liquids such as Hiflash naphtha, xylol, octyl alcohol, etc., etc. The high boiling solvent will be dispersed in the emulsion in widely varying amount, depending upon the boiling point of the low or medium boiling point solvent of the solution and upon the humidity under which the emulsion is to be dried. As illustrative, the high boiling solvent may be in amount of 10%-20% of the emulsion.

As more specifically illustrative of practical adaptation of this invention, for example, a solution of nitrocellulose as, for example, a lacquer, is made up on the following formula:

| | Percent |
|---|---|
| Nitrocellulose 15 seconds (Hercules) viscosity | 17.0 |
| Ester gum | 13.6 |
| Dibutyl phthalate | 3.4 |

| | Percent | |
|---|---|---|
| Solvent: Secondary hexyl acetate | 65 | |
| Butanol | 10 | |
| Hiflash solvent naphtha | 25 | 66.0 |
| | | 100.0 |

Sixty-seven parts of the above solution are then mixed with thirty-three parts of water containing 0.5% sodium lauryl sulphate and 1.0% sulphonated castor oil (75% grade) and emulsification effected by passing through a homogenizer, as, for example, a Manton-Gaulin homogenizer. To the emulsion, when it is to be used, is added 10%-20%, say 10% of, for example, butyl lactate, which is emulsified in the water of the emulsion as a distinct disperse phase, by shaking or stirring.

The above emulsion will, when sprayed, form a smooth, uniform coating and will dry to a clear film at humidities as high as 85%.

As further illustrative, for example, nitrocellulose solutions may be made up on the following formulae:

| | 1 | 2 | 3 |
|---|---|---|---|
| | Per cent | Per cent | Per cent |
| Nitrocellulose | 17.0 | 17.0 | 17.0 |
| Ester gum | 13.6 | 13.6 | 13.6 |
| Dibutyl phthalate | 3.4 | 3.4 | 3.4 |
| Butyl acetate | 40.0 | | |
| Secondary hexyl acetate | | 40.0 | 16.5 |
| Octyl acetate | | | 16.5 |
| Butanol | 7.0 | 7.0 | 9.2 |
| Ethyl alcohol | | | 7.3 |
| High flash solvent naphtha | 19.0 | 19.0 | 16.5 |

The above solutions may be emulsified by passing through a homogenizer with water containing an emulsifying agent, as, for example, 0.5% sodium lauryl sulphate and 1.0% sulphonated castor oil. A ratio of 2.5 parts of nitrocellulose solution to 1 part water will be efficient. After emulsification and when it is desired to use the emulsion, 10% or 15% of butyl lactate, octyl acetate, fenchone, or the like, water-immiscible high boiling solvent is emulsified in the water of the emulsion by shaking or stirring.

It will now be appreciated that in accordance with this invention an emulsion which will dry to a clear film under conditions of high humidity, up to 80%-90% humidity, is provided without the necessity for providing a nitrocellulose solution comprising expensive high boiling solvents and which is uneconomic unless used under conditions of high humidity.

What I claim and desire to protect by Letters Patent is:

1. The method of modifying a nitrocellulose emulsion comprising a substantially water-immiscible nitrocellulose solution emulsified as the disperse phase in an aqueous solution of an emulsifying agent, so as to enable it to dry to a clear film under conditions of high humidity, which includes adding to the said emulsion a substantially water-immiscible volatile organic liquid substantially free of non-volatile matter and characterized by having a boiling point higher than that of the lowest boiling solvent in the emulsified nitrocellulose solution, and emulsifying said added liquid in the emulsion as a second disperse phase.

2. The method of modifying a nitrocellulose emulsion comprising a substantially water-immiscible nitrocellulose solution containing about 10%-50% nitrocellulose, emulsified as the disperse phase in an aqueous solution of an emulsifying agent, so as to enable it to dry to a clear film under conditions of high humidity, which includes adding to the said emulsion a substantially water-immiscible volatile organic liquid substantially free of non-volatile matter and characterized by having a boiling point higher than that of the lowest boiling solvent in the emulsified nitrocellulose solution, and emulsifying said added liquid in the emulsion as a second disperse phase.

3. The method of modifying a nitrocellulose emulsion comprising a substantially water-immiscible nitrocellulose solution containing about 10%-50% nitrocellulose, emulsified as the disperse phase in an aqueous solution of an emulsifying agent in a ratio of nitrocellulose solution to water of about 2:1 to about 3:1, so as to enable it to dry to a clear film under conditions of high humidity, which includes adding to the said emulsion a substantially water-immiscible volatile organic liquid substantially free of nonvolatile matter and characterized by having a boiling point higher than that of the lowest boiling solvent in the emulsified nitro-cellulose solution, and emulsifying said added liquid in the emulsion as a second disperse phase.

4. The method of modifying a nitrocellulose emulsion comprising a substantially water-immiscible nitrocellulose solution containing about 10%-50% nitrocellulose, emulsified as the disperse phase in an aqueous solution of an emulsifying agent in a ratio of nitrocellulose solution to water of about 2:1 to about 3:1, so as to enable it to dry to a clear film under conditions of high humidity, which includes adding to the said emulsion a substantially water-immiscible volatile organic liquid substantially free of nonvolatile matter and characterized by having a boiling point higher than that of the solvent in the emulsified nitrocellulose solution, and emulsifying said added liquid in the emulsion as a second disperse phase.

5. The method of modifying a nitrocellulose emulsion comprising a substantially water-immiscible nitrocellulose solution containing about 10%–50% nitrocellulose, emulsified as the disperse phase in an aqueous solution of an emulsifying agent in a ratio of nitrocellulose solution to water of about 2:1 to about 3:1, so as to enable it to dry to a clear film under conditions of high humidity, which includes adding to the said emulsion, in amount of about 10%–20% thereof, a substantially water-immiscible volatile organic liquid substantially free of non-volatile matter and characterized by having a boiling point higher than that of the solvent in the emulsified nitrocellulose solution, and emulsifying said added liquid in the emulsion as a second disperse phase.

6. The method of modifying a nitrocellulose emulsion comprising a substantially water-immiscible nitrocellulose solution containing about 10%–50% nitrocellulose dissolved in a solvent boiling at about 150° C., emulsified as the disperse phase in an aqueous solution of an emulsifying agent, so as to enable it to dry to a clear film under conditions of high humidity, which includes adding to the said emulsion a substantially water-immiscible volatile organic liquid substantially free of non-volatile matter and characterized by having a boiling point higher than that of the solvent in the emulsified nitrocellulose solution, and emulsifying said added liquid in the emulsion as a second disperse phase.

7. The method of modifying a nitrocellulose emulsion comprising a substantially water-immiscible nitrocellulose solution emulsified as the disperse phase in an aqueous solution of an emulsifying agent, so as to enable it to dry to a clear film under conditions of high humidity, which includes adding to the said emulsion a substantially water-immiscible volatile nitrocellulose solvent substantially free of non-volatile matter and characterized by having a boiling point higher than that of the lowest boiling solvent in the emulsified nitrocellulose solution, and emulsifying said added solvent in the emulsion as a second disperse phase.

8. The method of modifying a nitro-cellulose emulsion comprising substantially water-immiscible nitrocellulose solution containing about 10%–50% nitrocellulose, emulsified as the disperse phase in an aqueus solution of an emulsifying agent in a ratio of nitrocellulose solution to water of about 2:1 to about 3:1, so as to enable it to dry to a clear film under conditions of high humidity, which includes adding to the said emulsion a substantially water-immiscible volatile nitrocellulose solvent substantially free of non-volatile matter and characterized by having a boiling point higher than that of the lowest boiling solvent in the emulsified nitrocellulose solution, and emulsifying said added solvent in the emulsion as a second disperse phase.

9. The method of modifying a nitrocellulose emulsion comprising a substantially water-immiscible nitrocellulose solution containing about 10%–50% nitrocellulose, emulsified as the disperse phase in an aqueous solutiton of an emulsifying agent in a ratio of nitrocellulose solution to water of about 2:1 to about 3:1, so as to enable it to dry to a clear film under conditions of high humidity, which includes adding to the said emulsion, in amount of about 10%–20% thereof, a substantially water-immiscible volatile nitrocellulose solvent substantially free of non-volatile matter and characterized by having a boiling point higher than that of the solvent in the emulsified nitrocellulose solution, and emulsifying said added solvent in the emulsion as a second disperse phase.

10. The method of modifying a nitrocellulose emulsion comprising a substantially water-immiscible nitrocellulose solution containing about 10%–50% nitrocellulose, emulsified as the disperse phase in an aqueous solution of an emulsifying agent in a ratio of nitrocellulose solution to water of about 2:1 to about 3:1, so as to enable it to dry to a clear film under conditions of high humidity, which includes adding to the said emulsion butyl lactate, and emulsifying said added liquid in the emulsion as a second disperse phase.

11. The method of modifying a nitrocellulose emulsion comprising a substantially water-immiscible nitrocellulose solution containing about 10%–50% nitrocellulose, emulsified as the disperse phase in an aqueous solution of an emulsifying agent in a ratio of nitrocellulose solution to water of about 2:1 to about 3:1, so as to enable it to dry to a clear film under conditions of high humidity, which includes adding to the said emulsion octyl acetate, and emulsifying said added liquid in the emulsion as a second disperse phase.

12. The method of modifying a nitrocellulose emulsion comprising a substantially water-immiscible nitrocellulose solution containing about 10%–50% nitrocellulose, emulsified as the disperse phase in an aqueous solution of an emulsifying agent in a ratio of nitrocellulose solution to water of about 2:1 to about 3:1, so as to enable it to dry to a clear film under conditions of high humidity, which includes adding to the said emulsion fenchone, and emulsifying said added liquid in the emulsion as a second disperse phase.

13. A nitrocellulose emulsion comprising a substantially water-immiscible nitrocellulose solution emulsified as the disperse phase in an aqueous solution of an emulsifying agent, which emulsion has been modified so as to enable it to dry to a clear film under conditions of high humidity by the addition thereto of a substantially water-immiscible volatile organic liquid substantially free of non-volatile matter and characterized by having a boiling point higher than that of the lowest boiling solvent in the emulsified nitrocellulose solution, said added liquid being present in the emulsion as a second disperse phase.

14. A nitrocellulose emulsion comprising a substantially water-immiscible nitrocellulose solution emulsified as the disperse phase in an aqueous solution of an emulsifying agent, which emulsion has been modified so as to enable it to dry to a clear film under conditions of high humidity by the addition thereto, in amount of about 10%–20% thereof, of a substantially water-immiscible volatile organic liquid substantially free of non-volatile matter and characterized by having a boiling point higher than that of the lowest boiling solvent in the emulsified nitrocellulose solution, said added liquid being present in the emulsion as a second disperse phase.

15. A nitrocellulose emulsion comprising a substantially water-immiscible nitrocellulose solution containing about 10%–50% nitrocellulose, emulsified as the disperse phase in an aqueous solution of an emulsifying agent in a ratio of nitrocellulose solution to water of about 2:1 to about 3:1, which emulsion has been modified so as to enable it to dry to a clear film under conditions of high humidity by the addition thereto of a substantially water-immiscible volatile organic liquid substantially free of non-volatile matter and characterized by having a boiling point higher than that of the lowest boiling solvent in the emulsified nitrocellulose solution, said added liquid being present in the emulsion as a second disperse phase.

16. A nitrocellulose emulsion comprising a substantially water-immiscible nitrocellulose solution containing about 10%–50% nitrocellulose, emulsified as the disperse phase in an aqueous solution of an emulsifying agent in a ratio of nitrocellulose solution to water of about 2:1 to about 3:1, which emulsion has been modified so as to enable it to dry to a clear film under conditions of high humidity by the addition thereto, in amount of about 10%–20% thereof, of a substantially water-immiscible volatile organic liquid substantially free of non-volatile matter and characterized by having a boiling point higher than that of the lowest boiling solvent in the emulsified nitrocellulose solution, said added liquid being present in the emulsion as a second disperse phase.

JOHN K. SPEICHER.